United States Patent [19]

Larson

[11] 4,446,506

[45] May 1, 1984

[54] PHOTOGRAPHIC LIGHT DIFFUSER

[75] Inventor: Raymond G. Larson, Huntington Beach, Calif.

[73] Assignee: Larson Enterprises, Inc., Fountain Valley, Calif.

[21] Appl. No.: 440,749

[22] Filed: Nov. 12, 1982

[51] Int. Cl.³ .............................................. G03B 15/02
[52] U.S. Cl. ........................................ 362/17; 362/18; 362/277; 362/278; 362/307; 362/310; 362/319; 362/320; 362/343; 362/346; 362/368; 362/370; 362/375; 362/449; 362/450
[58] Field of Search .................... 362/17, 18, 277, 278, 362/307, 310, 319, 320, 343, 346, 368, 370, 375, 449, 450

[56] References Cited

U.S. PATENT DOCUMENTS 4,052,607 10/1977 Larson ................................. 362/320
4,075,472 2/1978 Higuchi .............................. 362/352
4,146,918 3/1979 Tureck ................................ 362/352

Primary Examiner—Stephen J. Lechert, Jr.
Attorney, Agent, or Firm—Cislo, O'Reilly & Thomas

[57] ABSTRACT

A uniquely configured, constructed photographic light diffuser device for association with a photographic light source, which is versatile in that it is easily and releasably associated with variously configured light sources used in the photographic field, wherein the device is made up of articulated panel segments, the segments having different light reflecting, or diffusing qualities, wherein the diffusing member is easily and releasably associated with the light directing device so as to be able to make up a myriad of difference selected, polygonal configurations to vary lighting patterns and light intensity on photographic objects. The device is light weight and collapsible for ease of carrying and is particularly applicable to the photography field wherein it is desired to achieve and attain various lighting affects.

14 Claims, 10 Drawing Figures

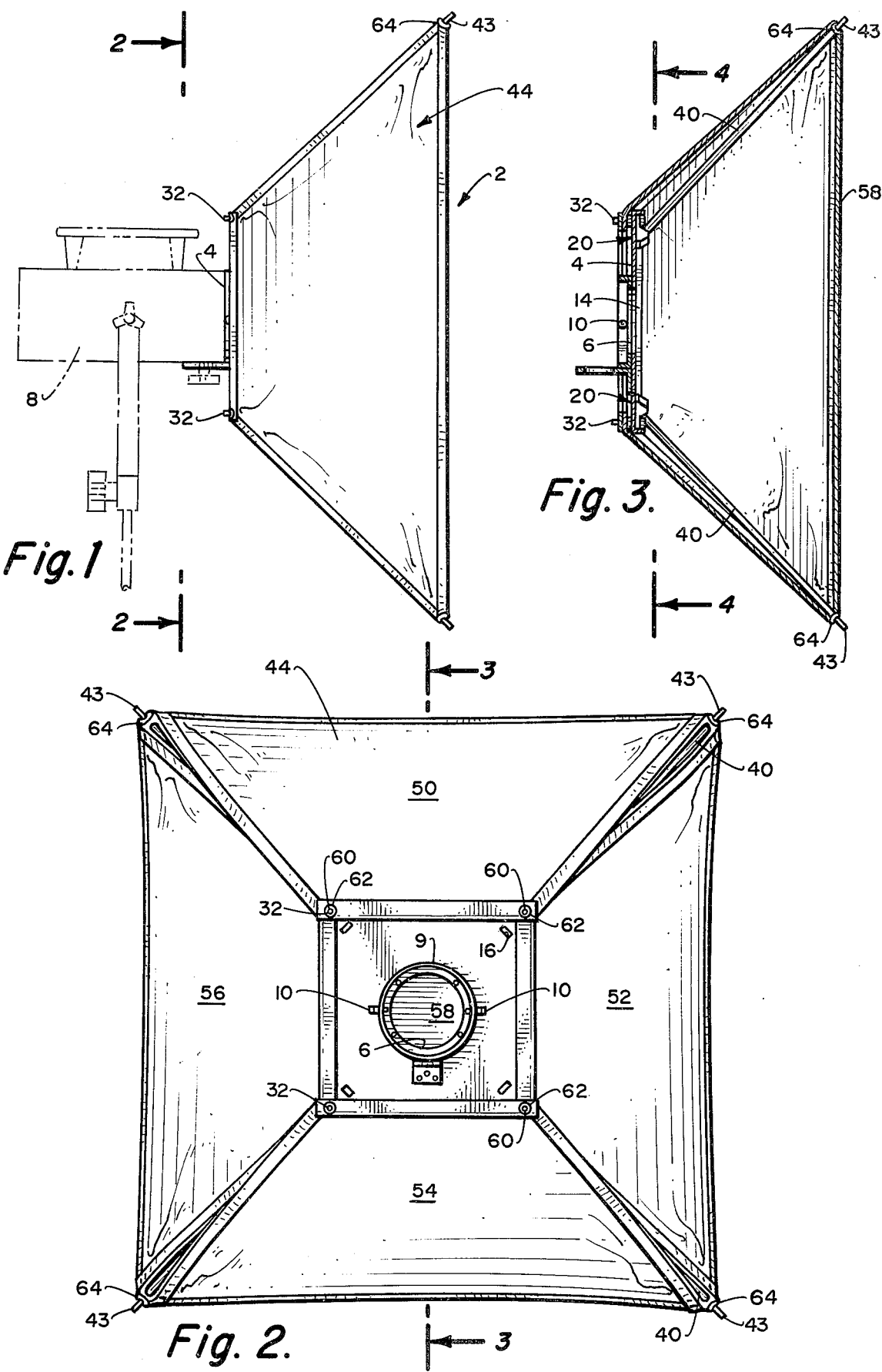

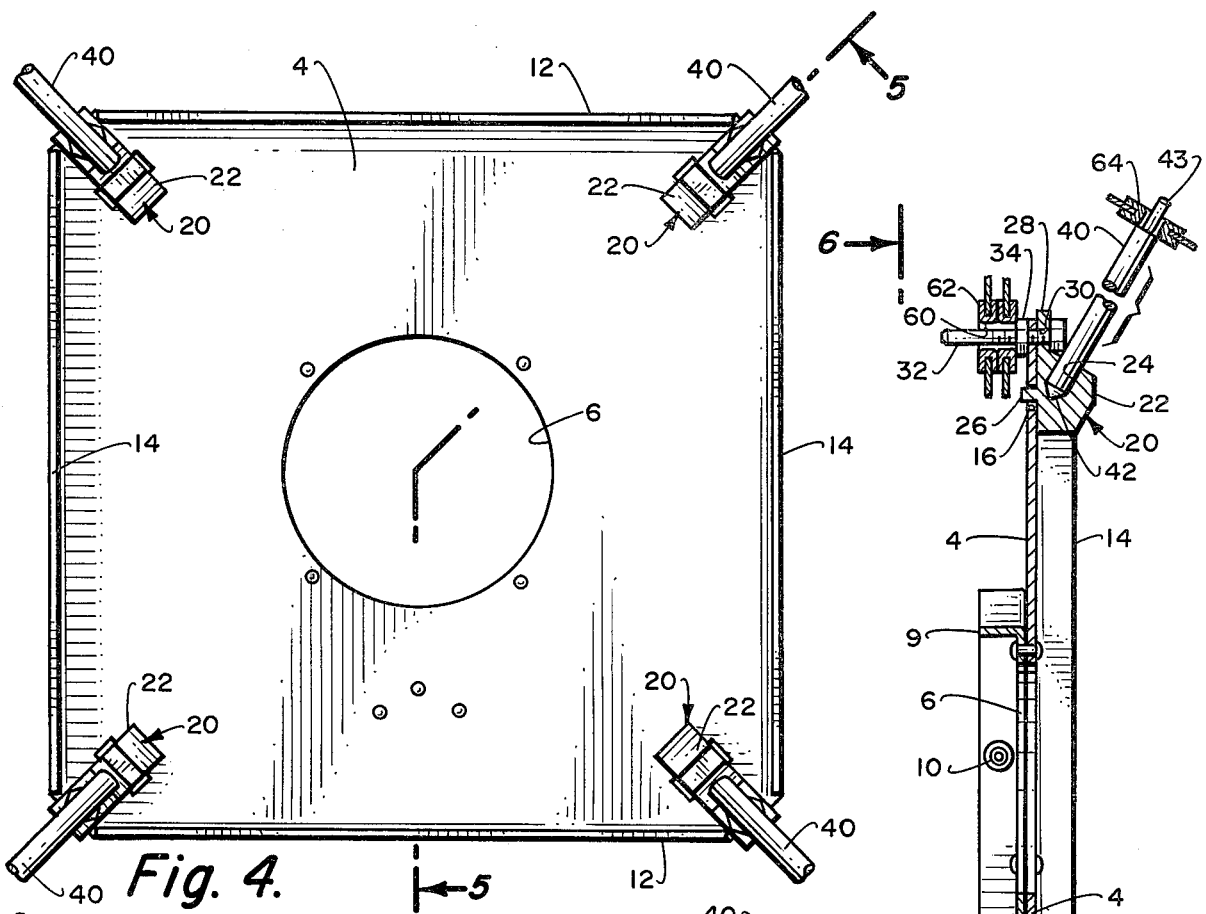
Fig. 4.
Fig. 5.
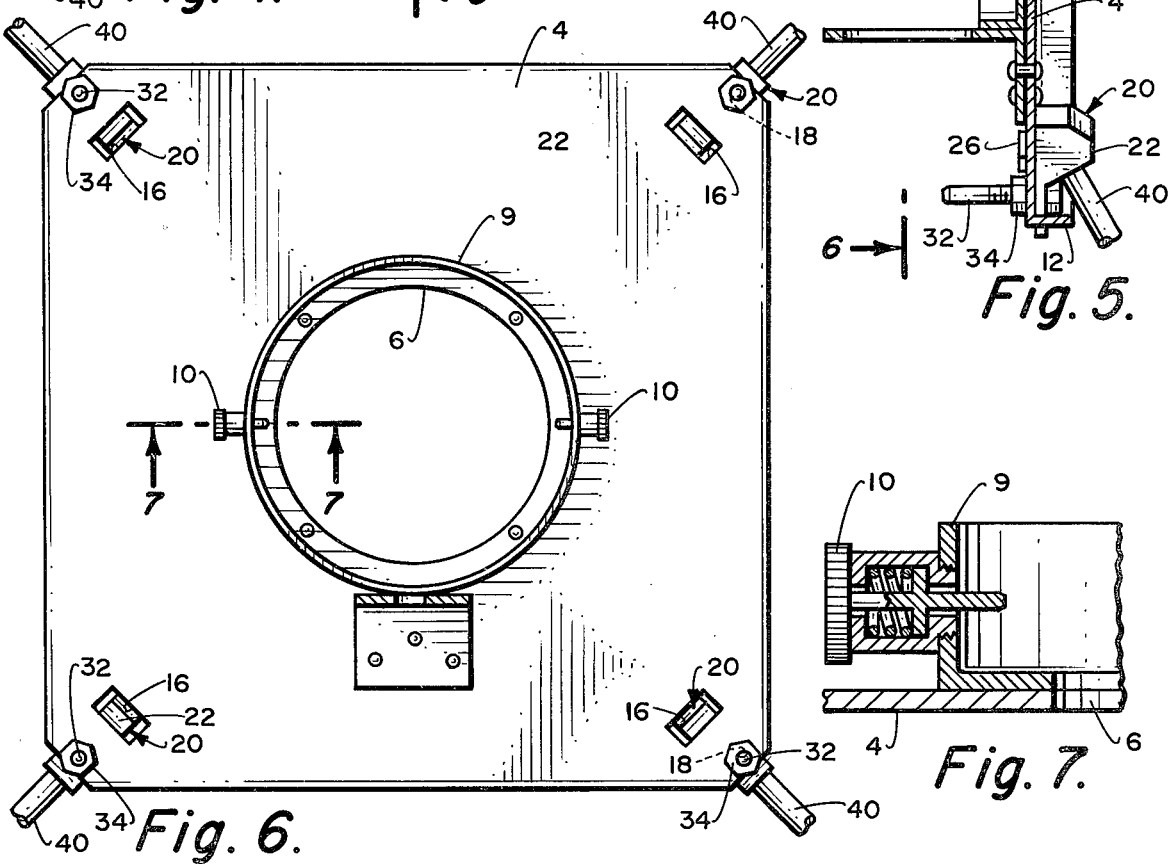
Fig. 6.
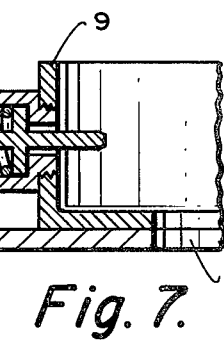
Fig. 7.

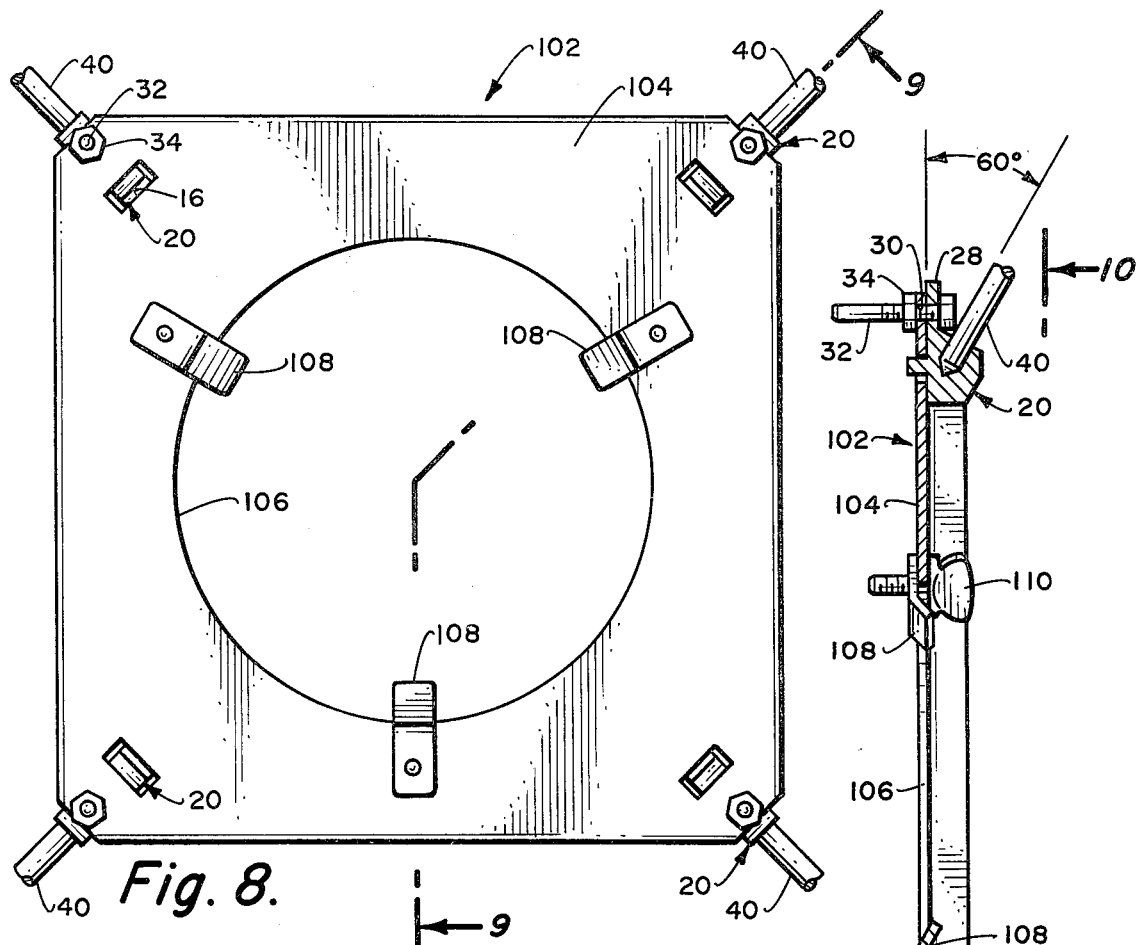
Fig. 8.
Fig. 9.
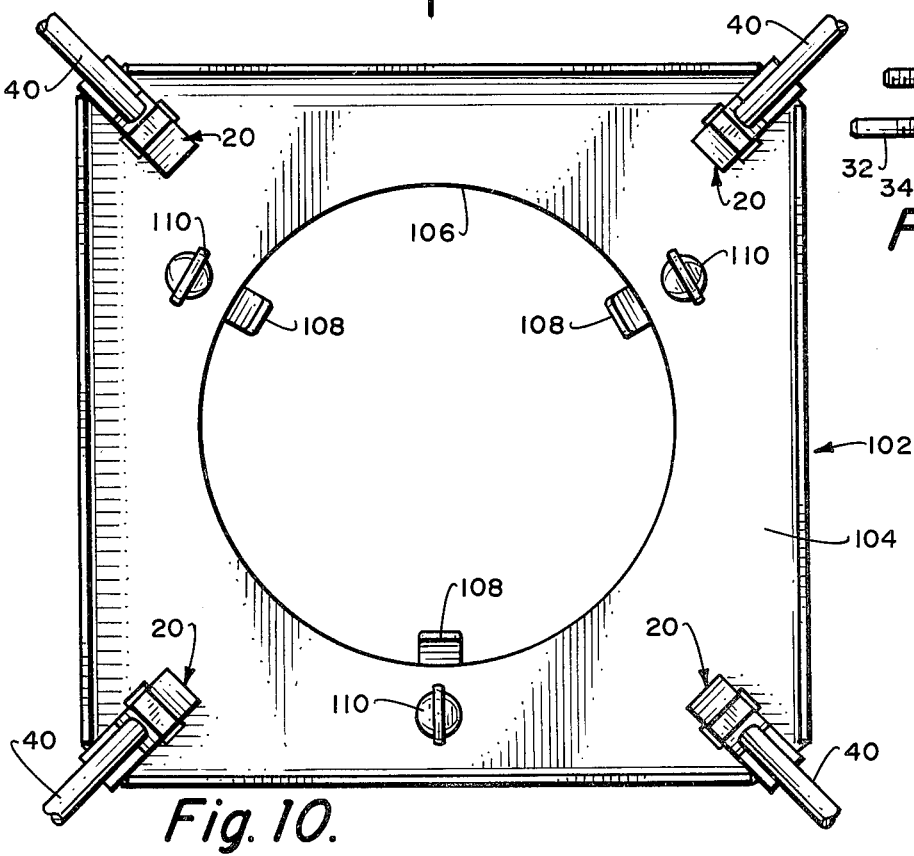
Fig. 10.

PHOTOGRAPHIC LIGHT DIFFUSER

BACKGROUND OF THE INVENTION

In the prior art, various light diffusing devices have been suggested and one such device is as disclosed in Larson U.S. Pat. No. 4,052,607.

In most of the prior art devices prior to the Larson Patent, supra, the devices have comprised stationary or noncollapsible and non-foldable types of screens or have involved various sophisticated and expensive devices which would be expensive to manufacture and cumbersome to handle from the photographer's standpoint.

The light diffuser of the aforecited Larson Patent made great strides in overcoming many of the prior arts difficulties with respect to their inability to be versatile with respect to selective cooperative arrangement with various sizes and types of photography lighting devices.

However, the aforecited prior art devices were somewhat limited in the sense that the structures required sophisticated mechanisms which were often times costly to fabricate and difficult to service and maintain in the context of having moveable parts that could be damaged, considering the asportability that was needed in the devices. Additionally, the type of light diffusion obtained by the prior art devices, including that of the aforecited Larson Patent, did not always fulfill the needs of the persnickety photographer.

With the herein disclosed device, a photographic light diffusing and light directing device is disclosed which is not only easily collapsible and erectable, but also requires no sophisticated mechanical mechanisms that could be damaged during erection and disassembly of the device into its component parts for transportability. Additionally, the device of the herein disclosed invention is capable of association, in cooperative arrangement, with a variety of different lighting sources of various manufactures, all in releasable fashion and wherein the device may be used as a diffuser or director of light from the lighting source with which it is utilized in a facile manner. The devices of the invention also permit various selected lighting affects to be easily obtained for selective lighting affects for photographic purposes.

The devices of the invention does not require any moveable mechanical parts, thereby insuring longevity of usage and low cost of construction and are easy to operate. Also because of the light weight and breakdown character of the device, it may be easily carried from place to place and readily associated, through versatile means of attachment, with various light sources having various configurations.

OBJECTS AND SUMMARY OF THE INVENTION

It is an object of the invention to provide a photographic light diffusing and directing device which is easily adapted with a light source.

It is another object of the invention to provide a photographic light diffusing and light directing device which is light weight, collapsible and easily carried.

It is still another object of the invention to provide a photographic light diffusing and directing device wherein a myriad of lighting affects is obtainable.

It is still another still further important object of the invention to provide a photographic light diffusing and light directing device wherein support structure, upon which the light diffusing and light directing surfaces of the device are supported, is secured in releasable fashion so that the device may be diserected into an easily carried state.

It is still another more important specific object of the invention to provide a light diffusing and light directing device utilizing a fabric element which is easily disassociable with a support structure which is in turn placed in cooperative engagement with a light source and wherein the fabric element may be varied to a plurality of polygonal configurations to vary lighting effects.

It is still another and more important even further specific object of the invention to provide a photographic light diffusing and light directing device for assocation with a light source in a facile manner.

It is still another more important and even more specific object of the invention to provide a light diffusing device which is versatile in its combination with a photographic light source wherein the device is associated with the light source in a unique and stable manner.

It is still another even more specific and further object of the invention to provide a light diffusing device for association with a photographic light source wherein a plurality of support members are radially and releasably supported from a mounting member which is adapted for cooperative and releasable association with a light source.

It is still an even further and more specific object of the invention to provide a light diffusing and light directing device wherein a mounting member is associated with a light source and wherein a plurality of support members are radially and releasably supported from the mounting members and wherein at least one segment panel is releasably supported from said support members.

Basically, in an exemplary embodiment, the invention is directed to a photographic light diffuser device or the like comprising a mounting member adapted for cooperative and releasable association with a light source wherein a plurality of support members are radially and releasably supported from said mounting member. At least one segment panel adapted for releasable supported engagement with said support members and said mounting member is provided wherein said segment panel, in the supported state, forms selected polygonal configurations to direct and alter light emitting from a light source with which the device is utilized.

These and other objects of the invention will become apparent as the description proceeds herein when taken in conjunction with the drawings and the hereinafter following commentary.

BRIEF DESCRIPTION OF THE DRAWINGS

FIG. 1 is a side elevation view of the device of the invention shown in association with a photographic light source the same being shown in phantom line;

FIG. 2 is a view taken along the line 2—2 of FIG. 1;

FIG. 3 is a view taken along the line 3—3 of FIG. 2;

FIG. 4 is a view, enlarged for purposes of clarity, taken along the line 4—4 of FIG. 3;

FIG. 5 is a view taken along the line 5—5 of FIG. 4;

FIG. 6 is a view taken along the line 6—6 of FIG. 5;

FIG. 7 is an enlarged view taken along the line 7—7 of FIG. 6;

FIG. 8 is a view similar to the showing in FIG. 6, but illustrating an alternative mounting member for association with a different photographic light source;

FIG. 9 is a view taken along the line 9—9 of FIG. 8; and

FIG. 10 is a view taken along the line 10—10 of FIG. 9.

DESCRIPTION OF THE BEST EMBODIMENTS CONTEMPLATED

Referring to the drawings wherein like numerals of reference designate like elements throughout, it will be noted that the photographic light directing and diffusing device 2 of the invention comprises a mounting member 4, in this instance taking the form of a rectangular or square plate 4 having a central opening 6 of selected configuration with detent members 10 for association with the outer casing or housing of a photographic light source such as 8.

The plate 4 is provided with a perimetric flanges 12 and 14 formed at right angles to the surface of plate 4 and is provided with apertures 16 in each of the four corners at the approximate extremity thereof. The plate 4 is also provided with through holes 18 for purposes that will become apparent. Positioned at each of the corners of plate 4 is retainer member 20 which has a polygonal block portion 22 having a recessed bore 24 therein and having an extending tab 26 adapted to be received into the aperture 16 of plate 4. The retainer member 20 has an extending tab end 28 with a through bore 30 by which each retaining member 20 may be secured to each of the corners by means of through bolt 32 and retained in rigid relationship by means of nut 34. It will be noted that the through bolt 32 is somewhat extenuated and is smooth surfaced beyond the retaining nut 34, that is not having threads thereon, for purposes that will become apparent as the description proceeds herein.

Disposed in each of the retainers 20, in radial fashion, are support members 40 each being of the same length and having a rod-like configuration with the terminus 42 being supported within the retainer 20 such that the rod 40 forms an angle of about 60 degrees with horizontal and about 30 degrees from vertical as best seen in FIG. 5. It will be noted that the opposite terminus 43 of rod 40 is of lesser diameter than the remainder of the rod so as to facilitate releasable fixation of a light diffusing and directing member 44.

The light diffusing member 44 is comprised of panel segments 50, 52, 54 and 56 attached to a front segment 58. The light diffusing and directing member 44 has the front wall 58 of a white nylon conformable material for example, which is opaque in nature and which provides for transmission of soft or diffused light there through that might emanate from the light source 8.

The side panels 50-56, inclusive, have a two wall construction wherein the exterior is of black cloth and the interior, inwardly directed towards the light source, has a light reflective quality so as to best reflect light emitting from the photographic light source 8 through the front panel 58 of light diffuser and director 44.

The trapezoidal shaped segments 50-56, inclusive, have metal grommeted apertures 60 at the side of the panels opposite the base of the trapezoid shapes and having metal grommets or reinforcements 62 to provide a means whereby the grommeted apertures 60 may be received on extending bolts 32, as best seen in FIGS. 1-3, inclusive. The light diffuser 44 is also provided with grommeted apertures 64 at each of the base points of the trapezoid segments 50-56, inclusive, thereby numbering four in number so as to be received from the supported radial support members 40 and more specifically, the reduced end portion 43 thereof.

The mounting plate 4, retaining members 20 and the supporting rods 40 are made of light weight metal so as to ease transportability of the device 2 of the invention.

Referring to FIGS. 1-7, inclusive, it will be illustrated how the device 2 of the invention is associated with a light source 8. The plate member 4 is firstly positioned with the light emitting end of a selected photographic device 8. The plate 4 is selected and is configured to be readily associable with the lighting source 8 by reason of the central opening 6, the surrounding flange and bracket 9 and the spring loaded detent 10, the dentents being intended to be received in receiving holes in the housing or casing of the photographic lighting device 8.

Once the plate 4 is rigidly secured to the light source 8, each of the rods or rays are inserted into friction fit reception in each of the retainer members 20. The light diffuser member 44 is then positioned such that the front panel 58 is placed in securement on the projecting rod ends 43 of each of the rods 40 and thereafter one or more of the grommeted apertures 60 are placed into received engagement with extending bolts 32 as best seen in FIGS. 1, 2, and 3. Not all of the segments 50-56, inclusive, need be put in place, depending upon the ultimate lighting affects desired. That is, one or more of the side panels 50-56, inclusive, may be folded inwardly in order to achieve unique lighting effects on a photographic subject. It is only important that sufficient rigidity be given to the light diffusing member 44 so as to provide a somewhat rigid, secured device 2 for mounting on the photographic light source 8.

Referring now to FIGS. 8-10, inclusive, there is illustrated an alternative form of the device differing from the device 2 only with respect to the base plate which is uniquely configured for association with a particular type or types of photographic light devices.

Thus, in this particular instance, the device 102 of the invention utilizes a support plate or member 104 having a larger central aperture 106 with extending tabs 108 uniquely positioned for association with a particular type of photographic housing device, not shown, wherein thumb screws 110, for example, may be used for secure disposition of the support plate 104 to the photographic device, not shown.

In all other particulars, the device 102 as illustrated in FIGS. 8-10, is identical to the device 2 hereinbefore described.

Obviously, the mounting members of the invention may take various forms and configurations for adaptability with various lighting sources. It is only important that the basic elements of the invention be employed in the mounting member which those of ordinary skill will readily appreciate.

Thus, there has been described and disclosed a photographic light diffusing and directing device for association with various light sources and strobes used in the photographic industry and all of which fulfill a need which the prior art devices have been unable to provide.

While the devices of the invention have been specifically described with regard to specific materials of construction and specific configurations, those of ordinary skill in the art will at once recognize certain changes and modifications, all of which will not depart from the spirit and essence of the invention and all such changes, modifications and alternatives are intended to be included in the appending claims.

I claim:

1. A photographic light diffusing device and the like comprising the combination:
- a mounting member adapted for cooperative and releasable association with a light source;
- a plurality of support members releasably supported from said mounting member; and
- at least one segment panel adapted for releasable, supported engagement with said support members and said mounting member, said segment panel in the supported state forming selected polygonal configurations to direct and alter light emitting from a light source with which said device is utilized.

2. The device, in accordance with Claim 1 wherein said support members are radially supported from said mounting member and extend therefrom in an outwardly directed fashion and including additional segment panels defining a diffusing member.

3. The device, in accordance with Claim 2 wherein said diffusing member comprises front and side panel segments, the said panel segments having means thereon for releasable association and cooperative relationship with said support members and said mounting member.

4. The device, in accordance with Claim 3 wherein the plurality of segment panels defining said diffusing member are of conformable material wherein said side panel segments making up said diffusing member have light reflective surfaces on the surface inwardly directed towards said light source and the front panel of said diffusing member is opaque.

5. The device, in accordance with Claim 3 wherein each of said support members are supported from the extremities of said mounting member in spaced relationship with each other.

6. The device, in accordance with Claim 5 wherein each of said supporting members forms an angle of about 60° from horizontal and about 30° from vertical.

7. The device, in accordance with Claim 5 wherein the terminus of each support member opposite said mounting member is of lesser diameter than the opposed terminus.

8. The device, in accordance with Claim 5 wherein each of said side panel segments has grommeted apertures for operative connection to said mounting member and said support members.

9. The device, in accordance with Claim 8 wherein each corner of said mounting member is provided with a support member retainer.

10. The device, in accordance with Claim 9 wherein each corner of said mounting member has a cut-out and said retainer has a tab member for disposition in said aperture and a securement means secures said retainer to said mounting member and extends a distance to provide means whereby said side panel segments may be secured in erected, operative relationship to said mounting member.

11. The device, in accordance with Claim 10 wherein said mounting member has a central opening to receive a light source and has cooperative securement means whereby said mounting member is rigidly secured to said light source.

12. The device, in accordance with Claim 11 wherein said mounting member, supporting members and retainers are of light weight metal.

13. A photographic light diffusing and directing device comprising the combination:
- a mounting member of plate form adapted for cooperative and releasable association with the housing of a photographic light source;
- a retaining member positioned in each corner of said plate-like mounting member and having a receiving bore to receive a supporting member in radial disposition to said plate-like mounting member;
- a rod-like supporting member disposed in each retaining member and extending outwardly from the said mounting member;
- a light diffusing member comprising an opaque front panel and side panels of truncated, trapezoidal configuration with grommeted apertures at each of the corners thereof, the diffusing member being adapted for releasable association with said outwardly supported supporting members and the small side of said trapezoidal shaped segments being adapted for association with said mounting member; and
- said light diffuser member in the supported state forming selected polygonal configurations to direct and alter light emitting from a light source with which the device is utilized.

14. A photographic light diffusing and directing device comprising the combination:
- a mounting member adapted for cooperative and releasable association with a light source;
- a plurality of support members radially and releasably supported from said mounting member; and
- a light diffuser member adapted for releasable and supported engagement with said support members and said mounting member, said light diffusing member defining an enclosing chamber encompassing said light source and adapted to direct and alter light emitting from said light source with which said device is utilized.

* * * * *